Aug. 18, 1959   J. SELBY ET AL   2,899,850
GEARING AND ELECTRIC DRILLS EMBODYING THE SAME
Filed Oct. 15, 1957   3 Sheets-Sheet 1
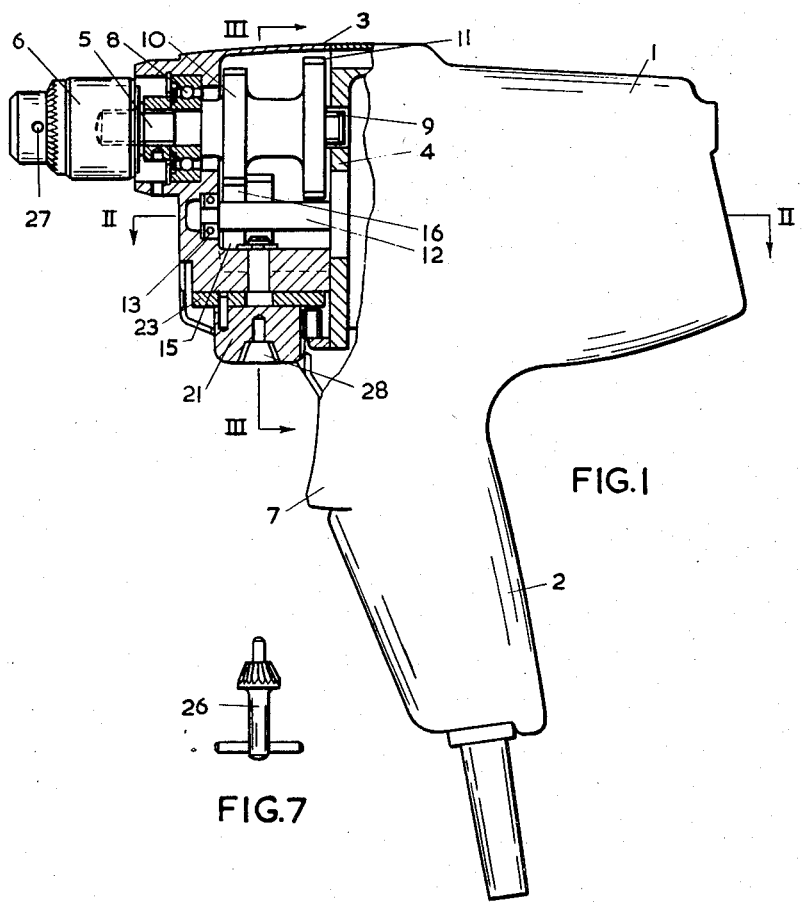
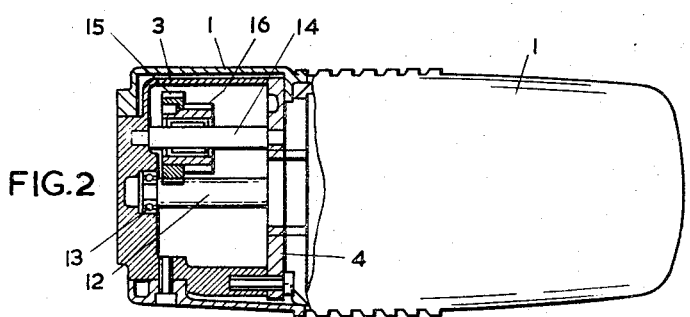
INVENTORS
JAMES SELBY and ALEC BRADLEY KIRKBRIDE
MAURICE WILLIAM TREBBLE
BY Hane and Nydick
ATTORNEYS Aug. 18, 1959    J. SELBY ET AL    2,899,850
GEARING AND ELECTRIC DRILLS EMBODYING THE SAME
Filed Oct. 15, 1957    3 Sheets-Sheet 2

INVENTORS
JAMES SELBY and ALEC BRADLEY KIRKBRIDE
MAURICE WILLIAM TREBBLE
BY Hane and Nydick
ATTORNEYS

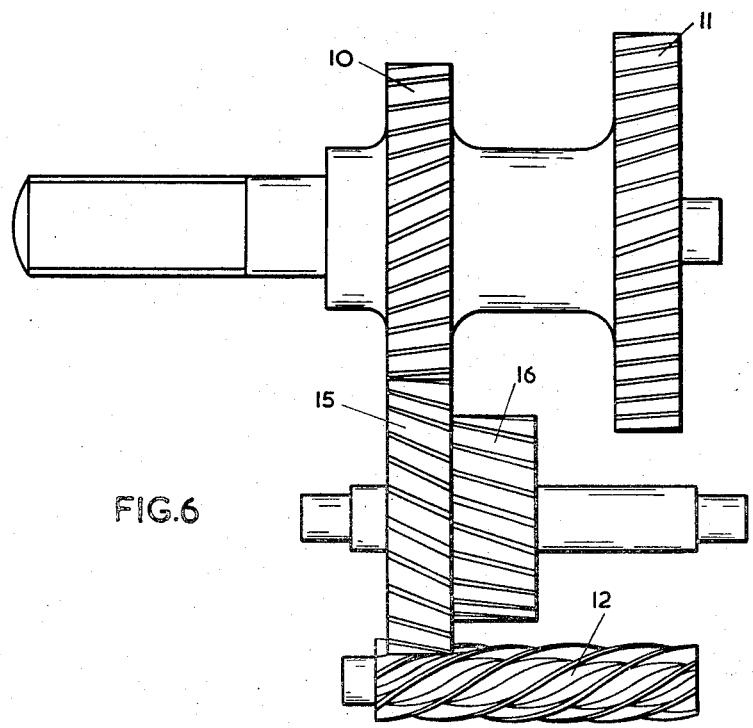

United States Patent Office 2,899,850
Patented Aug. 18, 1959

2,899,850

GEARING AND ELECTRIC DRILLS EMBODYING THE SAME

James Selby, Pinner, Alec Bradley Kirkbride, London, and Maurice William Trebble, Ealing, London, England, assignors to B. Elliott & Company Limited, London, England Application October 15, 1957, Serial No. 690,276

Claims priority, application Great Britain October 18, 1956

6 Claims. (Cl. 77—7)

This invention relates to gearing and has particular reference to gearing in which the gears have helical teeth. The invention has for its object the provision of improvements in such gearing, and also the provision of an improved electrical hand drill embodying such gearing.

The invention consists broadly of a gearing in which first and second gear wheels of different size and fast together are (or are adapted to be) respectively in mesh with third and fourth gear wheels so as to form a transmission element between said third and fourth gear wheels, wherein all of said gear wheels have helical teeth and the helix angle of the first and third gear wheels is different from that of the second and fourth gear wheels, in such a way that the axial thrusts on said first and second gear wheels are equal and opposite.

In order that the invention may be the more clearly understood an electric drill embodying the invention will now be described, reference being made to the accompanying drawings wherein:

Figure 1 is a side elevation of said drill shown partly in section on line I—I of Figure 1;

Figure 2 is a plan of the same shown partly in section on line II—II of Figure 1;

Figure 6 is a developed view of the change speed gearing employed in the drill;

Figure 7 is a view of an actuating tool employed with the drill.

Figure 3:
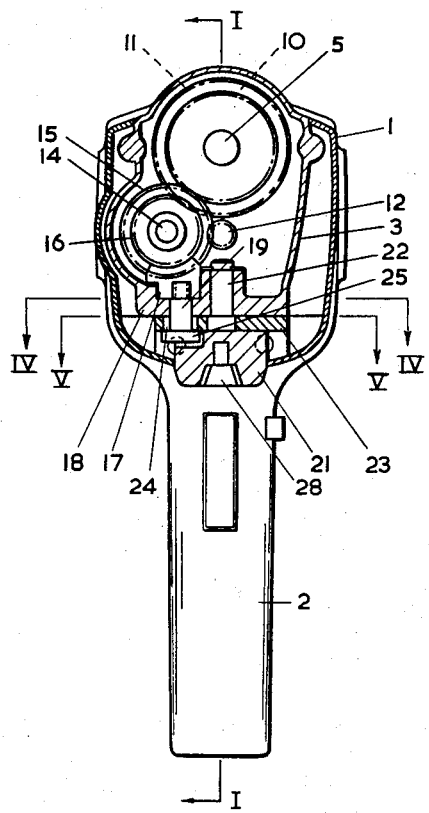
Figure 3 is a cross section on line III—III of Figure 1.

Referring to the drawings the electric drill is roughly in the form of a pistol in the well known way. Thus it comprises a main casing 1 containing an electric motor (not seen) whose axis of rotation will be assumed horizontal, and a handle portion 2 projecting rearwardly and downwardly from said main casing. Mounted in the forward end of said main casing 1 is a gear box 3, a vertical wall or partition 4 of said main casing being between said gear box and the electric motor. Said gear box 3 has rotatably mounted within it, parallel to the axis of the motor and at a higher level, a spindle 5 which, at its forward end, which projects beyond said gear box, has mounted fast on it the chuck 6 which is adapted to carry the drill. The gear box 3 has also within it, as will hereinafter appear, gearing adapted to couple the motor to the spindle 5 for either of two speeds of said spindle. The motor is controlled by a switch operated by a trigger-like member 7 mounted on the handle portion in the manner of the trigger of a pistol.

The spindle 5 runs in two bearings 8 and 9 respectively in the forward wall of the gear box 3 and the aforesaid wall or partition 4, and, mounted fast on said spindle 5 within the gear box, are two gear wheels, viz, a smaller gear wheel 10 at the forward end of the gear box and a larger gear wheel 11 at the rear end of the gear box. The motor shaft 12 extends forwardly into the gear box and at its forward end runs in ball bearings 13 in the forward wall of said gear box. The portion of said motor shaft 12 within the gear box is formed with gear teeth throughout its length (see Figure 6).

The gearing is completed by a double idler gear which runs freely on, and slides freely along a stationary rod 14 in the gear box parallel to the motor shaft 12 and spindle 5 and located to one side of the vertical plane containing said motor shaft and drill spindle. This double idler gear consists of a larger gear wheel 15 at its forward end and a smaller gear wheel 16 at its rear end. Said larger gear wheel 15 is permanently in mesh with the motor shaft 12.

Said double idler gear 15, 16, at its central position along the stationary rod 14, is between the two gear wheels 10 and 11 on the spindle 5, and, at this position, the motor is disconnected from said spindle 5. By sliding said double idler gear 15, 16 forwards the larger gear wheel 15 thereof engages the smaller gear wheel 10 on said spindle 5, and thereby couples the motor to said spindle 5 for relatively high speed rotation of the latter. By sliding said double idler gear 15, 16 rearwards, the smaller gear wheel 16 thereof engages the larger gear wheel 11 on said spindle 5 and thereby couples said motor to said spindle for relatively low speed rotation of the latter.

All the gears are helical gears, which has the advantage of giving relatively silent running. This means that during running an end thrust is applied to the motor shaft 12 in one direction (say rearwardly) and an end thrust is applied in the other direction to the spindle 5. However, during high speed running when only the larger gear wheel 15 of the double idler gear 15, 16 is operative, the corresponding end thrusts on said larger gear wheel 15 will cancel each other out. During low speed running, when both the gear wheels 15 and 16 of said double idler gear are operative, the end thrust on the larger gear wheel 15 of said double idler gear would ordinarily be less than that on the smaller one 16. However, to make these end thrusts equal so that they also cancel each other out, the helix angle of the teeth of the smaller gear wheel 16 of the double idler gear and of the larger gear wheel 11 on the spindle 5 is made less than the helix angle of the teeth of the larger gear wheel 15 of the double idler gear and of the smaller gear wheel 10 on the drill spindle.

Thus there is never any end thrust on the double idler gear 15, 16 (which has to be slid to change gear). The end thrust on the spindle 5 and the motor shaft 12 presents no problem.

In a particular arrangement, which is given by way of example only, the motor shaft 12 has eight teeth at a helix angle of 25° left hand. The larger gear wheel 15 of the double idler gear has 33 teeth at a helix angle of 25° right hand. The smaller gear wheel 16 of said double idler gear has 22 teeth at a helix angle of 18° 15' right hand.

The larger gear wheel 11 on the drill spindle has 46 teeth at a helix angle of 18° 15' left hand. The smaller gear wheel 10 on the drill spindle has 40 teeth at a helix angle of 25° left hand.

Figure 4:
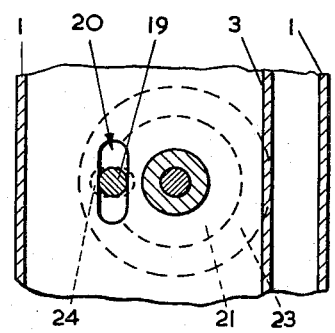
Figure 4 is a somewhat diagrammatic sectional plan on line IV—IV of Figure 3.
Figure 5:
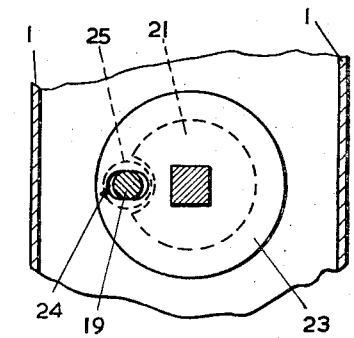
Figure 5 is a somewhat diagrammatic sectional plan on line V—V of Figure 3.

For effecting the axial movement of said double idler gear 15, 16, the gear wheel 15 thereof has its under portion engaged by a glut 17, which is slidable, in a direction parallel to the axis of said double idler gear, in a groove 18 formed in the bottom of the gear box 3. Said glut 17 is fast with a glut pin 19 which extends vertically downwards therefrom through a longitudinal slot 20 (Figure 4) in the bottom of the gear box, to the outside of said gear box. A control knob 21 is provided mounted fast on the lower end of a vertical spindle 22 which rotates in a bearing formed in the bottom of said gear box. Said vertical spindle 22 may be in the same vertical plane as the motor shaft and the drill spindle.

Between the upper surface of the control knob 21 and the under surface of the bottom of the gear box and attached fast to said control knob, a sealing disc 23 is provided. Said sealing disc has a central square hole by which it is threaded on to the vertical spindle 22 of the control knob, and it has a radial slot 24 through which passes the glut pin.

When the control knob 21 is rotated, the sealing disc 23 rotates with it and said radial slot 24 moves on the arc of a circle which, in general, extends in the direction of travel of the glut 17. Said radial slot 24 is sufficiently long to permit of relative radial movement between itself and the glut pin 19, and thus, as the control knob is rotated in opposite directions the glut pin 19 and glut 17 are driven longitudinally in opposite directions by the radial slot, and the double idler gear 15, 16 is moved between the higher and the lower speed position.

Said glut pin 19 at its lower end is formed with an enlarged head 25 which is accommodated by a clearance notch in the periphery of the control knob 21 as shown in Figure 3, and said sealing disc 23 fits closely between the bottom of the gear box above it and the control knob 21 and the head 25 of the glut pin below it. The purpose of said sealing disc 23 is to prevent egress of grease from the gear box through the longitudinal slot 20 in the bottom thereof, which slot is only partially covered by the glut 17, when the same is at either end of its travel.

Thus said sealing disc 21 wholly covers said longitudinal slot 20, except for a small area where said longitudinal slot coincides with the radial slot 24 in said disc. To prevent the exuding of any grease at this area, the head 25 on the glut pin 19 is made large enough to cover this radial slot, and thus there is no place where grease can escape from the gear box.

The spindle 5, as before stated, carries, in the usual way, a chuck 6 for holding the rear end of the drill, and this chuck is operated by means of a chuck key 26 (Figure 7) which is inserted in a hole 27 in the side of the chuck and then rotated.

In the present construction the control knob 21 is too small to be rotated by the fingers, and cannot be made large enough for this purpose without the appearance of the machine being spoiled. For rotating said control knob we use the same chuck key 26 which is used for operating the chuck, the control knob being provided with a concentric hole 28 in the bottom thereof adapted to receive said key.

It will be appreciated that when the chuck key is used for operating the chuck its end is inserted in the hole 27 thus bringing its teeth into engagement with the teeth of the chuck-controlling element, so that said chuck-controlling element is rotated by rotation of said chuck key in the manner of gearing. When however said chuck key is inserted in said hole 28 its teeth fit in corresponding teeth around the surface fo said hole, so that said chuck key and said knob 21 rotate as one piece.

We claim:

1. In a gear box having a gear shift element movable between selected positions within said gear box, a glut for shifting said gear shift element between said selected positions, said gear box having a wall defining a longitudinal slot, a glut pin integral at one end with said glut extending outwardly through said longitudinal slot in said gear box wall, and a sealing plate rotatably supported upon the outside of said wall in constant overlapping relationship with said longitudinally slot, said sealing plate having a radial slot in communication with said longitudinal slot and slidably receiving said glut pin therethrough, the opposite end of said glut pin having a head in flush engagement with the outside of said sealing plate and in constant overlapping engagement with said radial slot.

2. In a gear box as set forth in claim 1 wherein rotation of said sealing plate effects guided longitudinal movement of said glut pin and said glut relative to said longitudinal slot.

3. In a gear box as set forth in claim 2 and further comprising a control knob integral with said sealing plate for effecting rotation of said sealing plate.

4. A gearing according to claim 3, wherein said wall of said gear casing is a bottom wall.

5. An electric portable hand tool comprising, in combination, a main casing in the general form of a pistol, an electric motor within said casing having a forwardly extending shaft, a handle projecting downwardly from said casing, a gearing within the forward end of said casing drivenly connected to said motor shaft and having a spindle projecting forwardly outwardly through the forward end of said casing, a chuck for gripping a drill bit connected to said spindle, shift means connected to said gearing extending outwardly through said casing, a sealing plate carried by said shaft means blocking the passage of oil outwardly of said casing from the interior thereof, and a key selectively engageable with said chuck for adjusting the clamping action thereof and with said shift means for effecting adjustment thereof.

6. An electric portable hand drill as set forth in claim 5 and further comprising a control knob connected to said sealing plate, said control knob having a concentric opening receiving said key for effecting rotation of said sealing plate.

References Cited in the file of this patent
UNITED STATES PATENTS

| | | |
|---|---|---|
| 2,077,730 | Zimmermann | Apr. 20, 1937 |
| 2,486,254 | Briskin et al. | Oct. 25, 1949 |
| 2,845,806 | Miller | Aug. 5, 1958 |